(12) United States Patent
Moriya et al.

(10) Patent No.: US 12,494,187 B2
(45) Date of Patent: Dec. 9, 2025

(54) PANEL AND ELECTRONIC EQUIPMENT

(71) Applicant: CASIO COMPUTER CO., LTD., Tokyo (JP)

(72) Inventors: Takahiro Moriya, Kokubunji (JP); Hiroaki Hishiyama, Saitama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 297 days.

(21) Appl. No.: 18/200,099

(22) Filed: May 22, 2023

(65) Prior Publication Data
US 2023/0402023 A1    Dec. 14, 2023

(30) Foreign Application Priority Data
Jun. 9, 2022   (JP) ................. 2022-093691

(51) Int. Cl.
*G10H 1/00*   (2006.01)
*G02F 1/1335*   (2006.01)

(52) U.S. Cl.
CPC ..... *G10H 1/0008* (2013.01); *G02F 1/133512* (2013.01); *G02F 1/133514* (2013.01)

(58) Field of Classification Search
CPC ............ G10H 1/0008; G02F 1/133512; G02F 1/133514
USPC ................................. 362/97.1–97.4
See application file for complete search history.

(56) References Cited

U.S. PATENT DOCUMENTS

| 4,965,950 A | * | 10/1990 | Yamada | ............... B60Q 1/56 362/613 |
| 9,964,285 B2 | | 5/2018 | Shida | |
| 2015/0354759 A1 | | 12/2015 | Iimure et al. | |

FOREIGN PATENT DOCUMENTS

| JP | 2014085456 A | 5/2014 |
| WO | 2014129577 A1 | 8/2014 |
| WO | 2015125705 A1 | 8/2015 |

OTHER PUBLICATIONS

Japanese Office Action (and an English language translation thereof) dated May 7, 2024, issued in counterpart Japanese Application No. 2022-093691.

* cited by examiner

*Primary Examiner* — Thomas M Sember
(74) *Attorney, Agent, or Firm* — Holtz, Holtz & Volek PC

(57) ABSTRACT

A panel includes a coloring layer having light transmission characteristics relative to light from a light source, a first concealment layer provided on a rear surface side of the coloring layer, having light concealment characteristics relative to at least a part of light from the light source, and including an opening provided therein, and a second concealment layer provided on a rear surface side of the first concealment layer, having light concealment characteristics relative to at least a part of light from the light source, and including an opening provided therein in such a manner as to correspond to the opening in the first concealment layer, and the coloring layer is colored in a color different from those of the first concealment layer and the second concealment layer, the first concealment layer having a higher lightness than that of the second concealment layer.

6 Claims, 4 Drawing Sheets

PANEL AND ELECTRONIC EQUIPMENT

CROSS-REFERENCE TO RELATED APPLICATION

This patent application is based upon and claims the benefit of priority under 35 USC 119 of Japanese Patent Application No. 2022-093691 filed on Jun. 9, 2022, the entire disclosure of which, including the specification, claims, drawings and abstract, is incorporated herein by reference in its entirety.

BACKGROUND

Technical Field

The present invention relates to a panel and electronic equipment.

Description of the Related Art

There have conventionally been known panels for displaying illuminated characters, figures, symbols, and the like on a front surface thereof by receiving light from a light source on a rear surface side thereof. For example, Japanese Unexamined Patent Application Publication No. 2014-85456 (JP-A-2014-85456) discloses a decorative panel having provided thereon touch switches made up individually of characters and figures, which individually constitute indicators. This decorative panel includes a light guiding member, a support member, a molded resin layer having light transmission characteristics, a light cut-off layer, and a front plate having light transmission characteristics, which are disposed sequentially in that order from a rear surface side thereof. Light transmission holes matching the characters and figures making up the touch switches are provided in the light cut-off layer. With this decorative panel, when a light source provided on the rear surface side emits light, the light is then guided through the light guiding member to be incident on the molded resin layer, and only the light transmitted through the light transmission holes is shined to the front from the front plate. As a result, the characters and figures, which are the indicators, are illuminated to be displayed in the form of the corresponding light transmission holes on a front surface of the decoration panel.

SUMMARY

According to an aspect of the present disclosure, there is provided a panel including a coloring layer having light transmission characteristics with respect to light emitted from a light source, a first concealment layer provided on a rear surface side of the coloring layer, having light concealment characteristics with respect to at least a part of light emitted from the light source, and including an opening provided therein, and a second concealment layer provided on a rear surface side of the first concealment layer, having light concealment characteristics with respect to at least a part of light emitted from the light source, and including an opening provided therein in such a manner as to correspond to the opening in the first concealment layer, wherein the coloring layer is colored in a color which is different from those of the first concealment layer and the second concealment layer, and wherein the first concealment layer has a higher lightness than that of the second concealment layer.

According to another aspect of the present disclosure, there is provided electronic equipment including the panel and a light source configured to shine light onto a rear surface side of the panel.

DESCRIPTION OF THE EMBODIMENT

Figure 1:
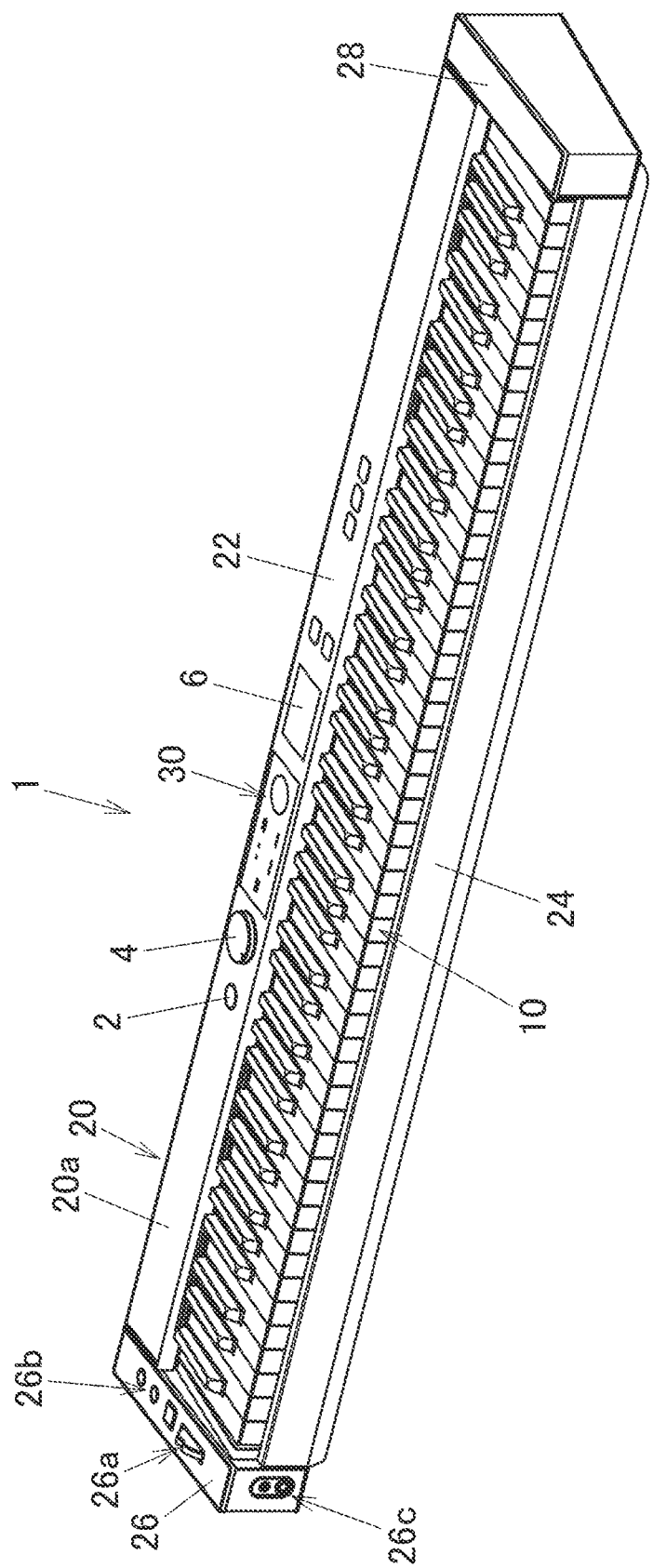
FIG. 1 is an overall perspective view of an electronic keyboard instrument according to an embodiment of the present disclosure.

Referring to accompanying drawings, an embodiment of the present disclosure will be described below. An electronic keyboard instrument (electronic equipment such as an electronic instrument) 1 shown in FIG. 1 includes a keyboard unit 10 including plural keys such as white keys and black keys, and a case 20. A control circuit board, not shown, and the like are accommodated in an interior of the case 20. Hereinafter, the embodiment will be described based on the understanding that a direction in which the plural keys are aligned in the electronic keyboard unit 10 is referred to as a left-right direction (a left side in FIG. 1 is referred to as a left direction), a front-rear direction of each key is referred to as front-rear direction (a nearer side in FIG. 1 is referred to as a front direction), and an up-down direction of the electronic keyboard instrument 1 is referred to as an up-down direction (an upper side in FIG. 1 is referred to as an up direction).

As seen from above, the case 20 has substantially a horizontally long rectangular shape in which a longitudinal direction of a whole keyboard follows the left-right direction and has an upper case 22, a lower case 24, a left case 26, and a right case 28. At least the upper case 22 is colored in a whitish or yellowish color and is formed from a synthetic resin. For example, the whitish color system includes colors of ivory, beige, TORINOKO or eggshell, GOHUN or a pigment of white or very slight yellowish white, milky white, KINARI or yellowish white, snow white (bluish white), and the like. The case 20 is colored in a color selected in accordance with the design of the electronic keyboard instrument 1. An upper surface of the upper case 22 is made into an upper panel 20a formed from an acrylic resin which can transmit visual light.

A power supply button 2 for switching on and off a power supply to the electronic keyboard instrument 1, a volume knob 4 for controlling the volume of sound produced in the electronic keyboard instrument 1, a liquid crystal display 6, and a control panel 30 are provided on the upper surface of the upper case 22. A pitch bender 26a, which is configured to control the pitch of a note by bending or changing smoothly the pitch of the note, setting buttons 26b for executing various settings, and the like are provided on an upper surface of the left case 26. In addition, an earphone jack 26c is provided in a front surface of the left case 26. The electronic keyboard instrument 1 includes a processor, and when the power supply is switched on so as to activate the electronic keyboard instrument 1, the processor causes the control panel 30 to be illuminated.

Figure 2:
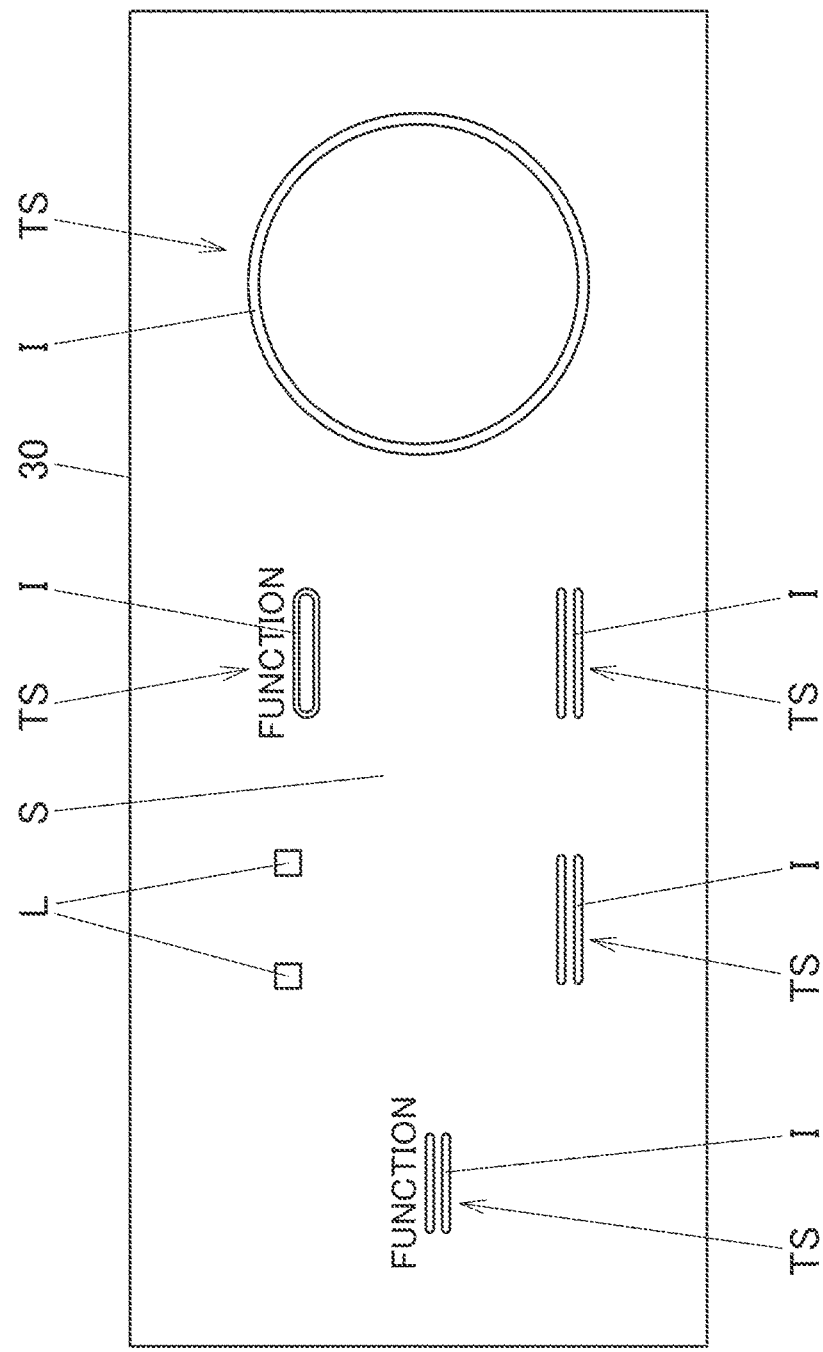
FIG. 2 is a plan view of a control panel of the electronic keyboard instrument according to the embodiment.

As shown in FIG. 2, lighting portions L (lighting areas) configured to be lit up and plural touch switches TS of a touch-sensitive panel type are provided in the control panel 30. These touch switches TS are electrostatic condenser-type switches for individually executing various types of functions associated with the electronic keyboard instrument 1, and various types of operations such as playing a piece of music for demonstration, changing timbres and brightness, and the like are assigned to the individual touch switches TS. Icons (indicators) I, which are configured to be lit up and are made up of annular and equal sign-like figures configured to indicate respective places of the touch switches TS, a word reading, for example, "FUNCTION" which denotes a role of a particular one of the touch switches TS, and symbols, are provided around circumferences of the individual touch switches TS. In the following description, the icons I also constitute lighting areas because the icons I are lit up by corresponding light sources 32a as with the lighting portions L.

A circumferential portion S which is provided so as to surround the lighting areas is visually recognized as a white or yellow area due to a color of a coloring layer 38 of a panel 36, which will be described later. Each icon I is indicated brightly because light emitted from a corresponding light source 32a made up of a light emitting diode (LED) or the like, which will be described later, is shined upwards from the icon I in question. On the other hand, being different from the icons I, the circumferential portion S is seen dark when viewed from above the control panel 30 because light emitted from each light source 32a is concealed by a concealment layer 39 of the panel 36, which will be described later. Thus, the icons I are seen as floating in the air above the circumferential portion S.

Figure 3:
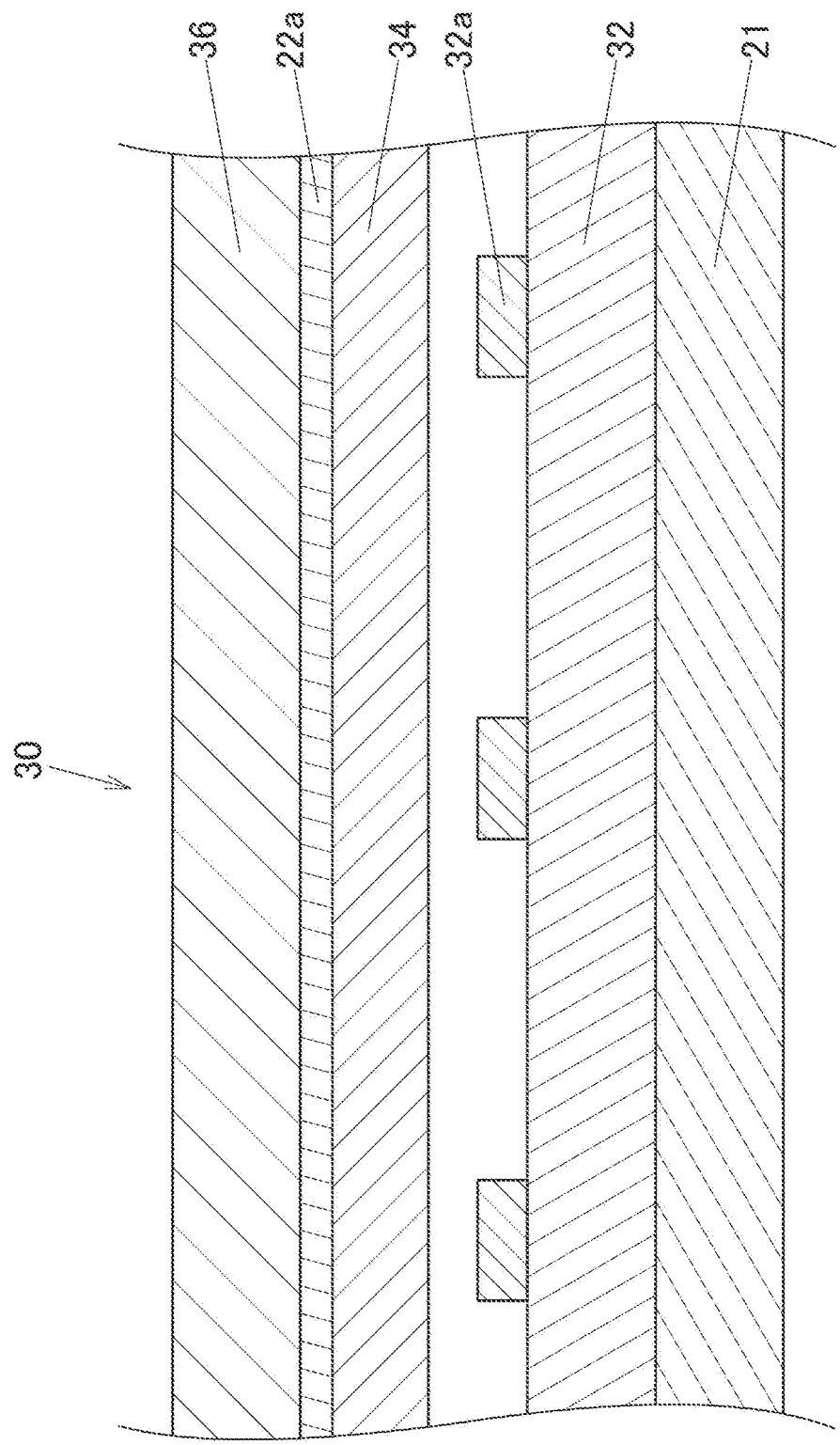
FIG. 3 is a schematic sectional view of the control panel of the electronic keyboard instrument according to the embodiment.

As shown in FIG. 3, briefly speaking, the control panel includes an inner case 21, which is provided independently of the upper case 22, a circuit board 32, a touch sensor 34 disposed above the circuit board 32, a portion of the upper case 22 which corresponds in position to the control panel (hereinafter, referred to as "a corresponding portion" 22a), and the panel 36 sequentially in that order as viewed from a lower side (a rear side) thereof. The circuit board 32 has substantially a horizontally elongated rectangular shape so as to extend substantially a whole area of the control panel 30. Light sources 32a are provided on an upper surface of the circuit board 32 in areas corresponding to the individual touch switches TS and lighting portions L in the up-down direction in such a manner that the light sources 32a emit light upwards, that is, towards the panel 36. Various types of wirings are laid out over the circuit board 32.

The circuit board 32, to which the light sources 32a are connected, is fixed in place by being held by the inner case 21 and the corresponding portion 22a therebetween. At each touch switch TS, a reflection case, not shown, is provided around a circumference of a space defined between the light source 32a and the touch sensor 34. The reflection case is configured to reflect light emitted from the light source 32a, and hence, the light emission efficiency from the panel 36 is increased, thereby enabling the icons I to be indicated highly contrastingly to the circumferential portion S.

The touch sensor 34 includes, for example, touch sensors of an electrostatic condenser-type, sheet metal members which are each opened in a center thereof and which constitute electrodes of touch panels, and the like. At each touch switch TS, when a touching operation is performed on the panel 36 (when the finger of a user touches or comes closer to the panel 36), the electrostatic capacity of the corresponding sheet metal member, which constitutes the electrode of the corresponding touch panel in the touch sensor 34, changes. The circuit board 32 detects this change in electrostatic capacity and transmits a detection signal. The processor of the electronic keyboard instrument 1 issues an instruction to execute a function corresponding to the touch switch TS so touched in response to receipt of the detection signal.

In addition, in order to inform a user who performs a touching operation of a detection of the touching operation so performed, the processor of the electronic keyboard instrument 1 may cause a light emitting form (for example, flashing) of the light source 32a for the touch switch TS on which the touching operation is performed to be different from a light emitting form (for example, continuing to be lit up) of the light source 32a for the touch switch TS on which no touching operation is performed. Lights emitted from the light sources 32a are shined upwards towards the panel 36 positioned above the touch sensor 34 through the openings in the sheet metal members in the touch sensor 34.

Figure 4:
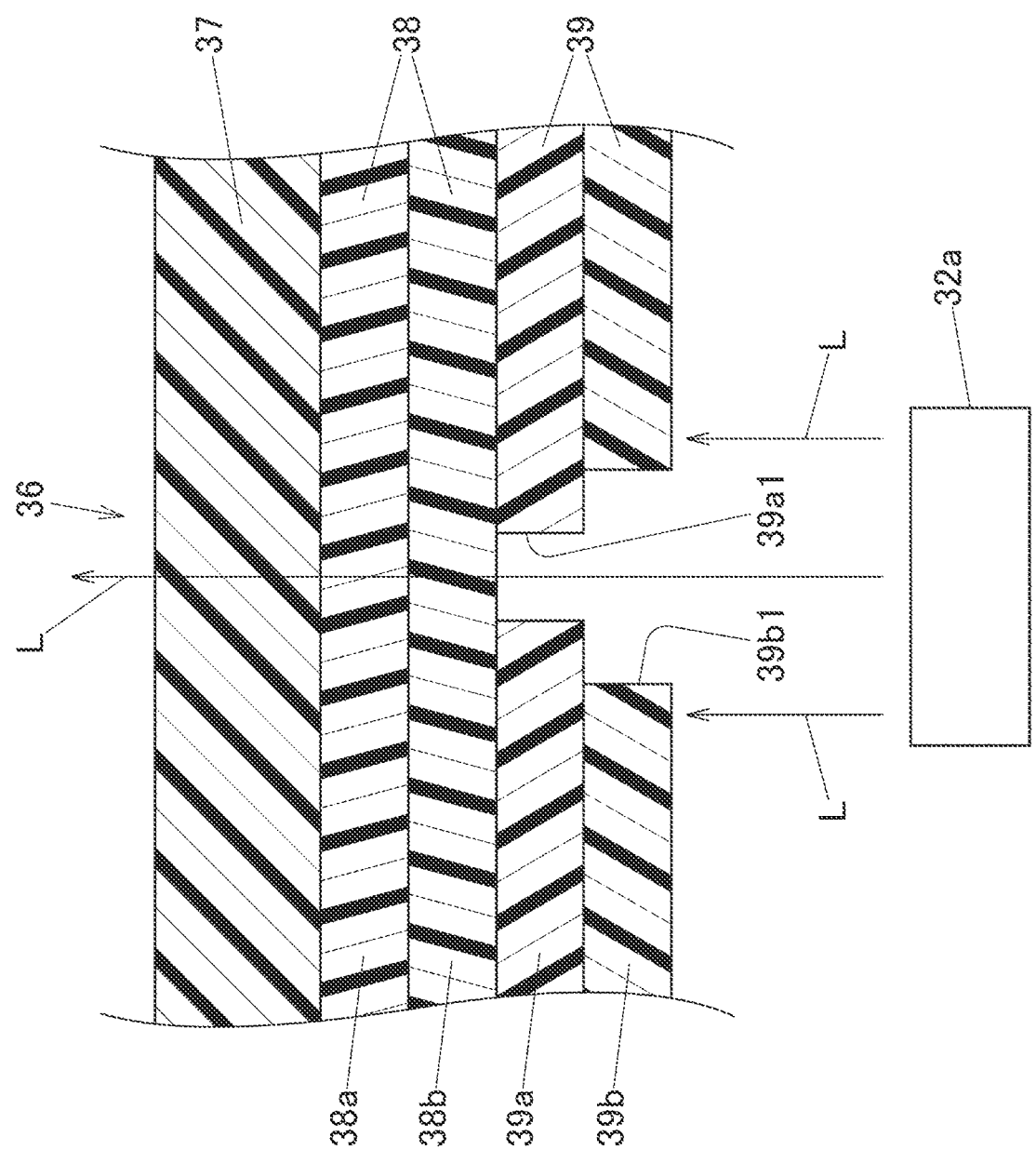
FIG. 4 is a schematic sectional view of a panel of the electronic keyboard instrument according to the embodiment.

As shown in FIG. 4, the panel 36 includes an acrylic base plate (substrate) 37 which can transmit light L from the light source 32a or the like. A thickness of the transparent acrylic base plate 37 is set, for example, to a range of 1 to 3 mm. Plural layers are laminated on a rear surface side (a lower surface side) of the base plate 37. Specifically speaking, the concealment layer 39 configured to conceal (cut off) light L is provided on the rear surface side of the base plate 37. The coloring layer 38 has a double-layer construction and has a toning layer (a first coloring layer) 38a and a transmission adjustment layer (a second coloring layer) 38b which are arranged sequentially in that order from a side (an upper side) nearer to the base plate 37. The concealment layer 39 has a double-layer construction and has a first concealment layer 39a and a second concealment layer 39b which are arranged sequentially in that order from a side (an upper side) nearer to the coloring layer 38. The touch sensor 34 is disposed below the concealment layer 39.

Light L emitted from each light source 32a passes through the touch sensor 34 and is then shined onto a rear surface side of the panel 36 or a lower side of the concealment layer 39. Since the coloring layer 38 has a concealing power which is lower than that of the concealment layer 39, when light L is incident thereon, the coloring layer 38 hardly conceals the color of the concealment layer 39. In contrast to this, the concealment layer 39 conceals the circumferential portion S so as to adjust sufficiently a contrast ratio between the circumferential portion S and the lighting areas.

The toning layer 38a of the coloring layer 38 is formed from an ink in which plural pigments of a white color system or a yellow color system are mixed together. The color of the toning layer 38a constitutes a main color which is visible at the circumferential portion S on a front surface of the control panel 30 through the base plate 37, and therefore, the color of the toning layer 38a is made by compounding plural pigments with each other or one another in advance so as to match a color which is desired to be visible at the circumferential portion S. The transmission adjustment layer 38b of the coloring layer 38 is formed by compounding a single ink containing a pigment of the same color system as that of the toning layer 38a or a white color system with a transparent ink containing a nonvolatile transparent material. A commercially available standard ink can be used for the single ink described above. In addition, a medium (a transparent medium in which a solvent and an additive are compounded with a polyester resin or the like) can be used for the transparent ink described above. Respective thicknesses of the toning layer 38*a* and the transmission adjustment layer 38*b* are set to fall, for example, within a range of 10 to 100 μm.

Here, the medium may also be contained in the toning layer (the first coloring layer) 38*a*, the first concealment layer 39*a*, and the second concealment layer 39*b*. The transmission adjustment layer 38*b* is an adjustment layer for adjusting the insufficiency of adequate shade to produce a color tone required for the control panel 30 or the insufficiency of adequate concealment of the color at the concealment layer 39 which would result when the coloring layer 38 is made up only of the toning layer 38*a*. In this way, the coloring layer 38 can be colored in colors or tones of a white color system or a yellow color system such as ivory, beige, TORINOKO or eggshell, GOHUN or a pigment of white or very slight yellowish white, milky white, KINARI or yellowish white, snow white (bluish white), and the like in accordance with designs by laminating layers which are colored accordingly. In addition, the transmission adjustment layer 38*b* is a layer in which the adding amount of the medium having light transmission characteristics is adjusted to adjust the luminance brightness of the lighting areas such as the icons I and the lighting portions L when they are lit up or to adjust the tone balance of the circumferential portion S which corresponds in position to the concealment layer 39 when the lighting areas are not lit up.

The first concealment layer 39*a* of the concealment layer 39 is formed from an ink of a light tone (for example, light grey) whose Munsell value in the Munsell color system is higher than that of the second concealment layer 39*b*. The second concealment layer 39*b* is formed from an ink of a dark tone (for example, dark grey) whose Munsell value in the Munsell color system is lower than that of the first concealment layer 39*a*. Specifically speaking, for example, inks whose Munsell values fall within a range of 7.0 to 8.0 when the Munsell hue in the Munsell color system is N can be used for the first concealment layer 39*a*. Then, for example, inks whose Munsell values fall within a range of 1.0 to 5.0 when the Munsell hue in the Munsell color system is N can be used for the second concealment layer 39*b*. Respective thickness of the first concealment layer 39*a* and the second concealment layer 39*b* are set to fall, for example, within a range of 10 to 100 μm.

Since the concealing power becomes higher as the Munsell value when the Munsell hue in the Munsell color system is N becomes lower, the second concealment layer 39*b* has a higher concealing power than that of the first concealment layer 39*a*. In the control panel 30, the brightness of the circumferential portion S can be adjusted to a color tone which is not too dark by the first concealment layer 39*a* having the higher Munsell value and positioned on the second concealment layer 39*b*, compared with a case in which the second concealment layer 39*b* is provided in place of the first concealment layer 39*a*, as a result of which the degree of freedom in design is enhanced.

The first concealment layer 39*a* is provided through reverse or knock out printing so that in the up-down direction (a thickness direction) of the first concealment layer 39*a*, first openings (openings) 39*a*1 are disposed at portions thereon which correspond in position to the lighting portions L and the respective lighting areas of the touch switches TS in such a manner as to penetrate the first concealment layer 39*a*. The plural first openings 39*a*1 are formed so as to match, in shape and size, the individual icons I and lighting portions L so that the resulting first openings 39*a*1 and the corresponding icons I and lighting portions L are superposed on each other in the up-down direction. In addition, second openings (openings) 39*b*1, which are opened in such a manner as to penetrate the second concealment layer 39*b*, are formed through reverse or knock out printing at portions on the second concealment layer 39*b* which correspond in position to the first openings 39*a*1 in the up-down direction. An opening width of the second opening 39*b*1 is made slightly larger (for example, larger by 0.1 to 1.5 mm) than an opening width of the first opening 39*a*1. In other words, the second openings 39*b*1 are provided in such a manner as to be disposed offset relative to the corresponding first openings 39*a*1.

In this way, the first openings 39*a*1 and the second openings 39*b*1 are provided in the concealment layer 39 at the portions corresponding in position to the lighting portions L and the lighting areas of the touch switches TS, whereby lights L emitted from the light sources 32*a* of the touch switches TS pass through the first openings 39*a*1 and the second openings 39*b*1 and are then transmitted through the coloring layer 38 to thereby be shined onto the rear surface side of the base plate 37. As a result, the lighting portions L and the icons I of the touch switches TS are illuminated to be displayed on the front surface side of the base plate 37.

Subsequently, respective functions of the individual layers printed on the rear surface side of the base plate 37 will be described. The toning layer 38*a* is formed by controlling the formulation ingredients or plural pigments so as to produce a color visible on the front surface of the control panel 30 (in the present embodiment, a color of a white color system or a yellow color system which is made to tone with a color required by the design). Since this layer contains the plural pigments, in mass production, a variation in color tone tends to be easily generated in accordance with a variation in formulation amounts. When this layer is laminated one on the other or another into plural layers, a variation in color tone which is visible on the front surface of the control panel 30 is increased as a result of accumulation of variations in formulation amounts in the individual layers, and hence, to avoid this risk, this toning layer 38*a* is preferably laminated to a required minimum number of layers. Thus, in the present embodiment, only the single toning layer 38*a* is provided.

The transmission adjustment layer 38*b* is a layer of the same color system as that of the toning layer 38*a* or a white color system, and the formulation amount of the transparent ink such as the medium is controlled therein. In the case that the coloring layer 38 is made up only of the toning layer 38*a*, the coloring layer 38 becomes too thin, and hence, although a desired color tone is hardly obtained due to insufficient coloring, adding the transmission adjustment layer 38*b* enables the adjustment of the color tone of the coloring layer 38. The number of types of pigments for use in the transmission adjustment layer 38*b* is limited to a pigment of a single color or to a fewer number of types of pigments than the number of types of pigments used in the toning layer 38*a*, and hence, compared with a case in which the toning layer 38*a* is laminated in place of the transmission adjustment layer 38*b*, a variation in color tone due to variations in formulation amounts of pigments at the time of production can be suppressed. In addition, since the formulation amount of the transparent ink such as the medium is controlled in the transmission adjustment layer 38*b*, the transmission adjustment layer 38*b* is superior in light transmission characteristic to the toning layer 38*a*. Due to this, lights L from the light sources 32*a* tend to be easily emitted from the panel 36 to the outside thereof, whereby the lighting areas such as the icons I can be illuminated brightly when they are illuminated.

The second concealment layer 39b effectively conceals light emitted from the light sources 32a by being formed in the color tone whose Munsell value is lower than that of the first concealment layer 39a. On the other hand, since the coloring layer 38 is formed by the required minimum number of layers in order to suppress the variation in color tone therein, in particular, when the light sources 32a are left switched off, the coloring layer 38 hardly conceals the color of the concealment layer 39.

Here, as a comparison example, let's study a case in which the concealment layer 39 is made up only of the second concealment layer 39b by omitting the first concealment layer 39a of the present embodiment. In this case, in order to meet the desired contrast ratio between the lighting areas and the circumferential portion S when the light sources 32a are illuminated, the lightness or the Munsell value of the second concealment layer 39b is set at a sufficiently low level as in the case of the present embodiment. The concealment of color by the concealment layer 39 becomes insufficient, and in particular, when the light sources 32a are left switched off, a part of outside light incident from the outside of the control panel 30 is reflected and scattered by the coloring layer 38, whereby light of a color tone matching the color tone of the coloring layer 38 is emitted to the outside of the control panel 30, while the other part of the outside light is absorbed by the concealment layer 39. Since the Munsell value of the concealment layer 39 directly below the coloring layer 38, that is, the second concealment layer 39b is low, an absorbing amount of outside light of the concealment layer 39 is increased, as a result of which the control panel 30 tends to look much darker than a color tone provided only by the coloring layer 38.

With the present embodiment, however, the first concealment layer 39a, whose Munsell value when the Munsell hue in the Munsell color system is N is relatively higher than that of the second concealment layer 39b and which has a light color tone, is interposed between the coloring layer 38 and the second concealment layer 39b, whereby the resulting light absorbing amount is suppressed to a slightly lower level than the light absorbing amount resulting when the concealment layer 39 is made up only of the second concealment layer 39b. Thus, even though the concealing power of the coloring layer 38 is insufficient, the control panel 30 can be seen as desired without being caused to become too dark due to the color of the base of the coloring layer 38. Here, the second concealment layer 39b and the first concealment layer 39a are not limited to those which conceal light perfectly but may be those which slightly transmit light.

Thus, as has been described heretofore, the panel 36 of the present embodiment includes the coloring layer 38 having light transmission characteristics with respect to light L emitted from the light sources 32a, the first concealment layer 39a which is provided on the rear surface side of the coloring layer 38, which can conceal at least a part of light L from the light sources 32a, and which has the openings provided therein, and the second concealment layer 39b which is provided on the rear surface side of the first concealment layer 39a, which can conceal at least a part of light L from the light sources 32a, and which has the openings provided therein in such a manner as to correspond individually to the openings in the first concealment layer 39a. The coloring layer 38 is colored in the different color from those of the first concealment layer 39a and the second concealment layer 39b. Then, the Munsell value of the first concealment layer 39a is higher than that of the second concealment layer 39b.

With the panel 36 according to the present embodiment, since the coloring layer 38 provided on the visible side is made to have the double-layer construction of the toning layer 38a in which the plural coloring materials are compounded together in order to produce the color tone of the panel 36 and the transmission adjustment layer 38b in which the single coloring material and the transparent medium are distributed, not only can light L of the light sources 32a be transmitted efficiently in the lighting areas while the color tone of the panel 36 is maintained, but also light L from the light sources 32a emitted on the rear surface side of the panel 36 is concealed effectively by the second concealment layer 39b. As a result, the indication in the good color tone and with the high contrast ratio can be executed in the lighting areas and the circumferential areas thereof. Then, even though the coloring layer 38 cannot conceal sufficiently the color of the concealment layer 39, since the Munsell value of the color of the first concealment layer 39a is high, compared with the case in which the first concealment layer 39a is not interposed, the color tone of the coloring layer 38 can be visualized strongly and brightly on the front surface side of the panel 36.

In addition, with the panel 36 of the embodiment, the coloring layer 38 is colored in the color of a white color system or a yellow color system. As a result, the panel 36 can be provided in which the pale color of a white color system or the like with the enhanced coloring effect is visualized on the front surface side thereof.

With the panel 36 of the embodiment, the coloring layer 38 has the toning layer 38a which contains the plural pigments or the plural dyes as the coloring materials and the transmission adjustment layer 38b which is provided on the rear surface side of the toning layer 38a and which contains a fewer types of pigments than those of the toning layer 38a or a fewer types of dyes than those of the toning layer 38a, as a single type of pigment or a single type of dye, and the nonvolatile transparent material. As a result, the color which is visualized on the front surface side of the control panel 30 can be adjusted by filling the insufficient color tone only by the transmission adjustment layer 38b. As a result, not only can the light transmissivity be improved more, but also the variation in color tone due to the variation in formulation of the dyes or pigments at the time of production can be suppressed more than when adjusting the color tone by laminating three or more such toning layers 38a one on another, while enhancing the coloring effect of panel 36. Further, since the color visible on the front surface side of the control panel 30 can be adjusted only by the single toning layer 38a, the number of times of printing the coloring layer 38 on the rear surface side of the base plate 37 can be suppressed, thereby making it possible to suppress the production costs associated with the printing of the coloring layer 38.

Additionally, with the panel 36 of the embodiment, the opening width of the second opening 39b1 provided in the second concealment layer 39b is larger than the opening width of the first opening 39a1 provided in the first concealment layer 39a. As a result, even in the event that a printing deviation occurs in the second concealment layer 39b which is printed subsequently to the first concealment layer 39a at the time of production, the second opening 39b1 can be provided in such a manner as to be superposed on the first opening 39a1 in the up-down direction.

With the panel 36 of the embodiment, when referred to herein, the lightness means the Munsell value in the Munsell color system. As a result, a clear standard can be provided to discriminate the Munsell value of the first concealment layer 39a from the Munsell value of the second concealment layer 39b.

With the panel 36 of the embodiment, the lighting areas such as the icons I which are configured to be lit up to be displayed in response to a touching operation performed on the touch panel are provided as the indicators. As a result, the specific form of indicators can be provided, and the touch panel can be realized in which the coloring effect of the lighting areas is enhanced.

In addition, the electronic keyboard instrument 1 according to the present embodiment includes the panel 36. As a result, the color visible on the front surface side of the control panel 30 can be adjusted in accordance with the color of the case 20 of the electronic keyboard instrument 1. Further, the electronic keyboard instrument 1 can be realized in which the coloring effect of the control panel is enhanced.

In the present embodiment, while the electronic keyboard instrument is described as electronic equipment, the present invention is not limited thereto but can also be applied to a personal computer, a printer, an electronic calculator, an electronic dictionary, a personal digital assistant (PDA), a projector, a wristwatch, household electronic equipment such as a table-top or desk-top clock, and office-use electronic equipment.

The embodiment that has been described heretofore is presented as the example, and hence, there is no intention to limit the scope of the present invention by the embodiment. The novel embodiment can be carried out in other various forms, and various omissions, replacements and modifications can be made thereto without departing from the spirit and scope of the present invention. Those resulting embodiments and modified examples thereof are included in the scope and gist of the present invention and are also included in the scope of inventions claimed for patent under claims below and their equivalents. For example, in the embodiment that has been described heretofore, while the configuration is illustrated in which the light sources are provided on the lower side of the panel, a configuration may be adopted in which the light sources are provided at one side of the panel, and light from the light sources is made to be incident on the rear surface side of the panel by way of a light guiding member. Additionally, in the embodiment that has been described heretofore, while the configuration is illustrated in which the coloring layer has the single transmission adjustment layer, a configuration may be adopted in which the coloring layer has plural transmission adjustment layers.

What is claimed is:

1. A panel comprising:
a coloring layer having light transmission characteristics with respect to light emitted from a light source;
a first concealment layer provided on a rear surface side of the coloring layer, having light concealment characteristics with respect to at least a part of light emitted from the light source, and comprising an opening provided therein; and
a second concealment layer provided on a rear surface side of the first concealment layer, having light concealment characteristics with respect to at least a part of light emitted from the light source, and comprising an opening provided therein in such a manner as to correspond to the opening in the first concealment layer,
wherein the coloring layer is colored in a color which is different from those of the first concealment layer and the second concealment layer, and
wherein the first concealment layer has a higher lightness than that of the second concealment layer,
wherein the coloring layer comprises a first layer containing plural pigments or plural dyes, and a second layer provided on a rear surface side of the first layer and containing fewer types of pigments than those of the first layer or fewer types of dyes than those of the first layer, and a nonvolatile transparent material.

2. The panel according to claim 1,
wherein the coloring layer is a color of a white color system or a yellow color system.

3. The panel according to claim 1,
wherein an opening width of the opening provided in the second concealment layer is larger than an opening width of the opening provided in the first concealment layer.

4. The panel according to claim 1,
wherein the lightness is a Munsell value in the Munsell color system.

5. The panel according to claim 1, further comprising:
an icon configured to be illuminated by light from the light source thorough the opening in the first concealment layer in response to a touching operation performed on a touch panel.

6. Electronic equipment comprising:
the panel according to claim 1; and
a light source configured to shine light onto a rear surface side of the panel.

* * * * *